United States Patent [19]

Kimura

[11] 4,370,038

[45] Jan. 25, 1983

[54] AUTOMATIC FOCUSSING SYSTEM

[75] Inventor: Kenji Kimura, Tachikawa, Japan

[73] Assignee: Olympus Optical Company Limited, Tokyo, Japan

[21] Appl. No.: 326,592

[22] Filed: Dec. 2, 1981

[30] Foreign Application Priority Data

Dec. 2, 1980 [JP] Japan .................. 55-169828

[51] Int. Cl.³ .................. G03B 3/10; H04N 5/26; G01J 1/44
[52] U.S. Cl. .................. 354/25; 358/227; 250/201
[58] Field of Search .......... 354/25 R, 25 A, 25 P, 354/25 N, 31 F; 352/140; 353/76, 101; 355/56; 358/227; 250/201; 350/46

[56] References Cited

U.S. PATENT DOCUMENTS

| | | | |
|---|---|---|---|
| 3,896,304 | 7/1975 | Aoki et al. | 354/25 X |
| 3,917,394 | 11/1975 | Sturdevant | 352/140 X |
| 3,941,996 | 3/1976 | Stauffer | 354/25 X |
| 4,045,805 | 8/1977 | Saito | 354/25 |

Primary Examiner—William B. Perkey
Attorney, Agent, or Firm—Stevens, Davis, Miller & Mosher

[57] ABSTRACT

In a system for driving automatically an objective lens into a desired focal position so as to form a focussed image on a film plane, in order to derive a driving signal for a driving motor moving the objective lens along its optical axis, an auxiliary lens is arranged movably along its optical axis, a moving coil and a position detecting coil are wound around a lens holder, magnets cooperating with the coils are arranged around the coils, and an array of photoelectric converting elements is arranged to receive a light flux transmitted through the auxiliary lens. The auxiliary lens is vibrated about a reference position by supplying a sinusoidal signal to the moving coil. An output signal from the array of photoelectric converting elements is supplied to a focus detection circuit to generate sampling pulses at such timings that the photoelectric converting elements receive the best focussed image. An output signal from the coil is supplied to a lens position detecting circuit to produce a lens position signal representing a deviation of the auxiliary lens with respect to the reference position. The lens position signal is sampled and held by the sampling signal to produce the driving signal for the motor.

11 Claims, 6 Drawing Figures

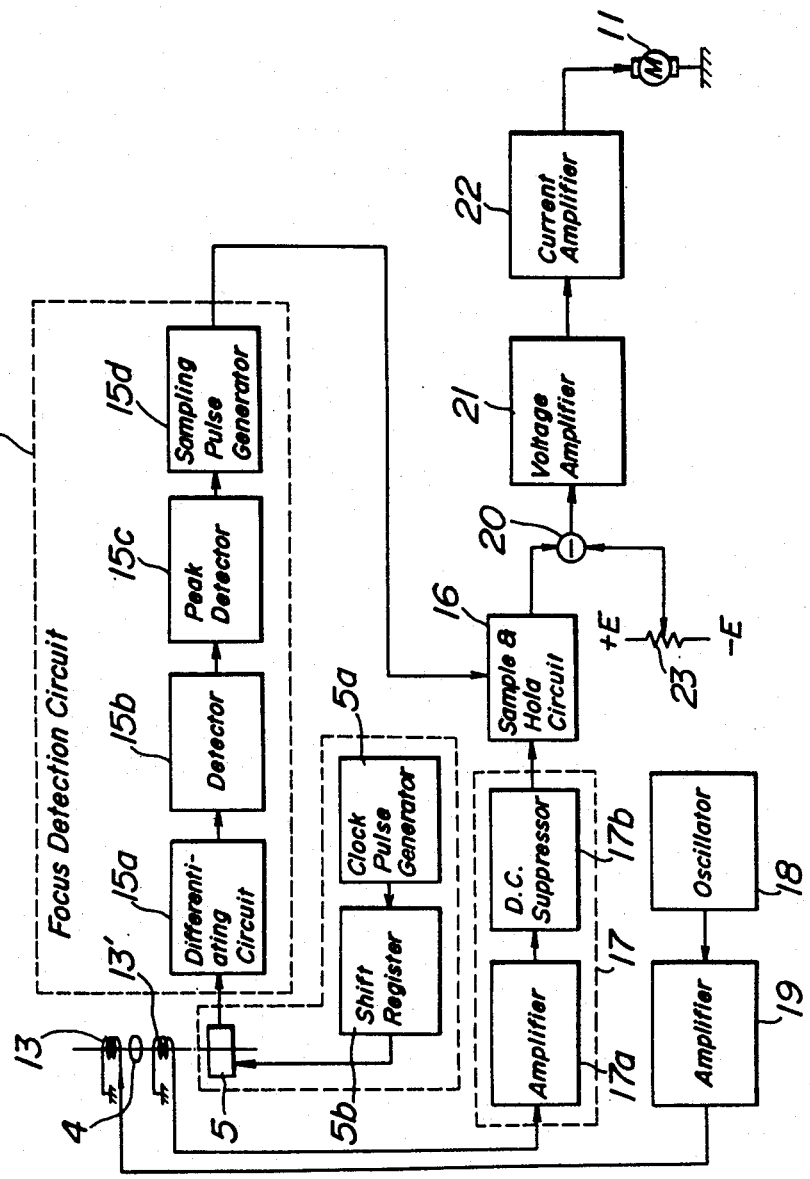

FIG_3
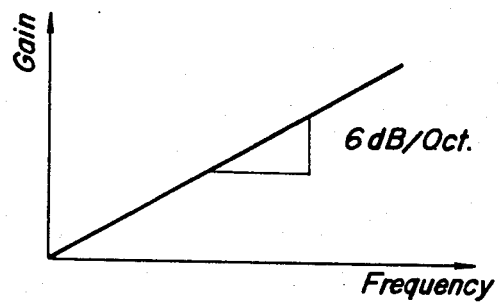
FIG_4
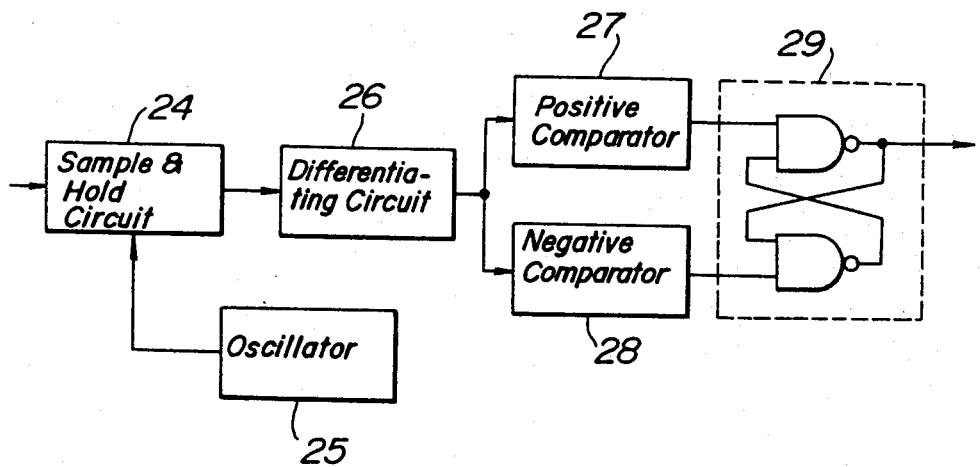

AUTOMATIC FOCUSSING SYSTEM

BACKGROUND OF THE INVENTION

The present invention relates to an automatic focussing system for driving an objective lens provided in a still camera, television camera and the like into an infocussed position so that a focussed image can be formed on a film or an image pick-up plane.

In one known automatic focussing system, a sharpness, i.e. contrast of an image formed on the film surface or the pick-up plane is detected and the detected signal is processed in accordance with a predetermined estimation function to obtain a focussing error signal. In another known system, a pair of photo detectors are arranged in front and behind a predetermined focal plane and output signals from the detectors are processed in accordance with a given estimation function to derive the focus information. However, in these known systems, since the photo detectors are arranged stationarily, the focussing error signal cannot be obtained accurately when the objective lens is deviated from a given position to a large extent.

SUMMARY OF THE INVENTION

The present invention has for its object to provide a novel and useful system for automatically driving an objective lens into a desired focus position over a very wide range.

According to the invention a system for automatically driving an objective lens in a still camera, a television camera and the like into a desired focus position so as to form a focussed image of an object onto a predetermined focal plane comprising:

an auxiliary lens for receiving at least a part of a light flux transmitted through said objective lens and arranged movably along an optical axis;

a photo detector arranged to receive an image formed by said auxiliary lens to produce an electric signal;

means for vibrating repeatedly said auxiliary lens along the optical axis about a reference position which is conjugated with said predetermined focal plane;

means for detecting a position of said auxiliary lens to produce a lens position signal representing a deviation of the auxiliary lens with respect to the reference position;

means for receiving said electric signal from the photo detector to derive timings at which the best focus condition is obtained during the vibration of the auxiliary lens to produce a sampling signal at said timings;

means for receiving said lens position signal and sampling signal to sample and hold the lens position signal by the sampling signal to produce a driving signal; and means for receiving the driving signal to move the objective lens into said desired focal position.

BRIEF DESCRIPTION OF THE DRAWINGS

FIG. 2 is a block diagram illustrating an embodiment of the automatic focussing system according to the invention;

FIG. 3 is a graph depicting a characteristic curve of a differentiating circuit in FIG. 2;

FIG. 4 is a block diagram showing one embodiment of a peak detection circuit in FIG. 2;

DESCRIPTION OF THE PREFERRED EMBODIMENTS

Figure 1:
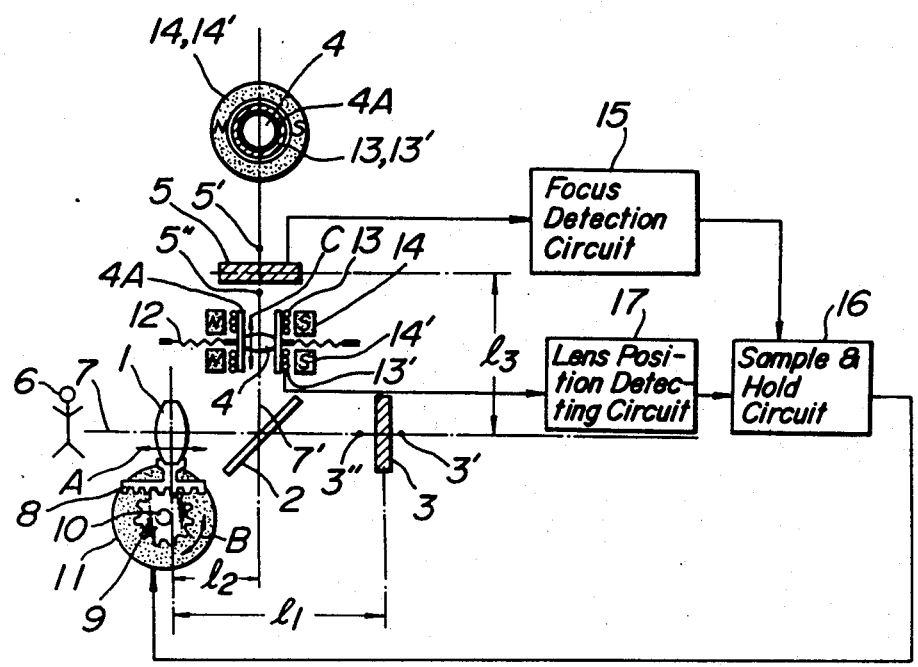
FIG. 1 is a schematic view showing a principal construction of the automatic focussing system according to the invention.

FIG. 1 is a schematic view showing a principal construction of the automatic focussing system according to the invention. The system comprises a first optical system for directing a light flux transmitted through an objective lens 1 and a half mirror 2 to an image pick-up plane 3 and a second optical system for directing the light flux reflected by the half mirror 2 to a photo detector 5 via an auxiliary lens 4. A light flux reflected from an object 6 is made incident upon the pick-up plane 3 along an optical axis 7. The objective lens 1 has to be adjusted in such a manner that the image formed by the lens is situated at the image pick-up plane 3, i.e. the objective lens 1 is moved in an in-focussed position. To this end, the objective lens 1 is movably arranged in a direction A parallel with the optical axis 7 and is provided with a rack 8 which is engaged with a pinion 9 connected to a driving shaft 10 of a reversible motor 11. By rotating the motor 11 in a direction shown by an arrow B, the objective lens 1 can be moved in the direction A. In this manner a distance between the objective lens 1 and the pick-up plane 3 can be adjusted.

A part of the light flux transmitted through the objective lens 1 is reflected by the half mirror 2 into an optical axis 7' and is made incident upon the photo detector 5 by means of the auxiliary lens 4. The auxiliary lens 4 is held by a lens holder 4A and the holder 4A is supported to a fixed member by a damper 12. Further a moving coil 13 is wound around the holder 4A. Around the coil 13 is provided a magnet 14. In FIG. 1, a plan view of the lens 4, coil 13 and magnet 14 is also shown. When an electric current is supplied to the moving coil 13, the auxiliary lens 4 is moved in the direction C along the optical axis 7'. In this manner, a distance between the auxiliary lens 4 and the photo detector 5 can be adjusted. In the present embodiment, when the electric current is not supplied to the coil 13, the auxiliary lens 4 becomes in a standard position at which the focussed image is formed on the photo detector 5 when the best focussed image is formed on the pick-up plane 3.

When a distance $l_1$ between the objective lens 1 and the pick-up plane 3 is different from a distance $l_2 + l_3$ between the objective lens 1 and the photo detector 5, a de-focussed condition at the photo detector 5 due to this difference in optical path length may be compensated for by moving the auxiliary lens 4 in the direction C. In the present embodiment, the distance $l_2 + l_3$ is made shorter than the distance $l_1$. A coil 13' is also provided on the holder 4A and a magnet 14' is arranged around the coil 13'. When the coil 13' moves in a constant magnetic field produced by the magnet 14', the coil 13' generates an electric signal representing a position of the coil 13' with respect to the magnet 14'. In this manner the position of the auxiliary lens 4 can be monitored.

An output signal from the photo detector 5 is supplied to a focus detection circuit 15 which produces a focussing signal on the basis of a sharpness i.e. a contrast of the image and the focussing signal thus produced is supplied to sample and hold circuit 16 as a sampling signal. The electric signal generated by the coil 13' is supplied to a lens position detecting circuit 17 and an output signal from the circuit 17 is supplied to the sample and hold circuit 16 and is sampled by the sampling signal from the focuss detection circuit 15. As described above, the output signal from the coil 13' is the positional signal representing the position of the auxiliary lens 4. Therefore, the sample and hold circuit 16 produces an output signal which represents direction and amount of a deviation of the auxiliary lens 4 with respect to the standard position when the best focussed condition is detected by the focus detecting circuit 15. Therefore, by energizing the reversible motor with the output signal from the sample and hold circuit 16 to move the objective lens 1 in the direction A until the best focussed condition is detected when the auxiliary lens 4 is just in the standard position. In this manner a negative feedback loop is constituted and the objective lens 1 can be automatically driven in the in-focussed condition.

FIG. 2 is a block diagram showing one embodiment of the automatic focussing system according to the invention. A sinusoidal oscillator 18 produces a sinusoidal wave having a frequency of, for instance, 100 Hz. This oscillator signal is amplified by a current amplifier 19 and the amplified signal is supplied to the moving coil 13. Then the moving coil 13 and thus the auxiliary lens 4 and the coil 13' are vibrated at the frequency of 100 Hz. Then the coil 13' produces the outut signal of sinusoidal waveform which is then supplied to the lens position detecting circuit 17. The circuit 17 comprises a voltage amplifier 17a for amplifying the input signal and a direct current suppressing circuit for removing direct current components from the amplified signal. Therefore, the output signal from the lens position detecting circuit 17 becomes a sinusoidal wave oscillating about zero volt. The photo detector 5 is composed of an array of a number of photoelectric converting elements such as a photo diode array, CCD (charge coupled device) and the like, which array is driven by clock pulses of 1 to 5 KHz supplied from a clock pulse generator 5a and a shift register 5b. Then the converted electrical signal is serially read out from the array and the read out signal is supplied to the focus detection circuit 16 which detects the contrast of the image of the object 6 and produces an output pulse when the highest contrast is detected. In the present embodiment, the focus detection circuit 15 comprises a differentiating circuit 15a, a detector 15b, a peak detector 15c and a sampling pulse generator 15d.

Now the operation of the focus detection circuit 15 will be explained. The output signal from the photo detector 5 is differentiated by the circuit 15a and a differentiated output signal is supplied to the detector 15b. The differentiating circuit 15a is a circuit consisting of a capacitor and a resistor for generating an output signal obtained by differentiating the input signal with respect to time. The differentiating circuit 15a has a frequency-gain characteristic having an ascendancy of about 6 dB/Oct. When the image is formed on the photo detector 5 in the best focussed condition, the contrast becomes highest and the signal from the photo detector 5 has the largest amount of high frequency components. Therefore, the differentiating circuit 15a produces the maximum output under the in-focussed condition. Then the detector 15b detects an envelope of the high frequency components in the output from the differentiating circuit 15a. In this manner, the detector 15b generates the output signal having an amplitude which varies in accordance with the degree of the focussing. The signal thus produced is supplied to the peak detector 15c which detects the maximum value of the signal.

FIG. 4 is a block diagram showing an embodiment of the peak detector 15c. The output signal from the detector 15b is sampled and held by a sample and hold circuit 24 in response to sampling pulses generated from an oscillator 25. The output signal from the sample and hold circuit 24 is supplied to a differentiating circuit 26 and a differentiated signal is parallely supplied to a positive comparator 27 and a negative comparator 28. In the comparators 27 and 28, the differentiated signal is compared with predetermined threshold levels, respectively and output pulses are produced when the differentiated signal exceeds the threshold levels. The output pulses from the positive and negative comparators 27 and 28 are supplied to set and reset inputs of an R-S flip-flop 29, respectively. Therefore, when the output pulse is supplied from the positive comparator 27, the flip-flop 29 is set and its output becomes the logic "1" level and when the output pulse from the negative comparator 28 is supplied to the flip-flop 29, its output changes from the logic level "1" to the logic level "0". The output from the flip-flop 29 in the peak detector 15c is supplied to the sampling pulse generator 15d which produces the sampling pulses to be supplied to the sample and hold circuit 16 at a trailing edge of the output signal from the flip-flop 29.

Figure 5:
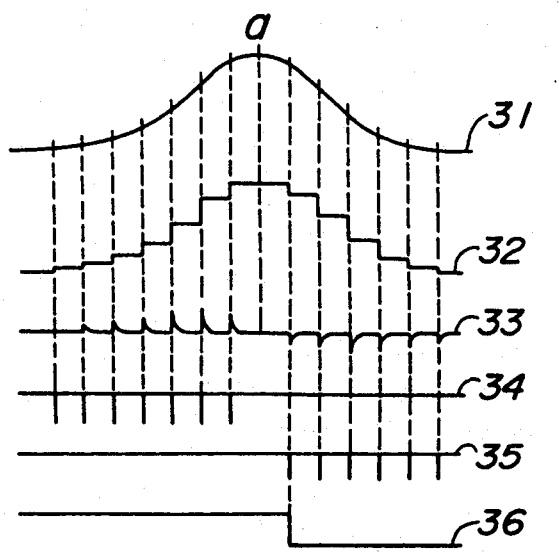
FIG. 5 shows waveforms of signals appearing at various points in the circuit of FIG. 4.

FIG. 5 shows waveforms of signals appearing at various points in the peak detector 15c illustrated in FIG. 4. A waveform 31 is the output signal from the differentiating circuit 15a and a point a is the maximum value point. A waveform 32 is the output signal from the sample and hold circuit 24. A waveform 33 is the output signal from the differentiating circuit 26. Waveforms 34 and 35 are the output signals from the positive and negative comparators 27 and 28, respectively. The lowermost waveform 36 is the output signal from the flip-flop 29, i.e. the output signal from the peak detector 15c. As shown in FIG. 5, a transient timing from "1" level to "0" level in the output signal from the flip-flop 29 is made substantially coincident with the maximum value point a. That is to say, a trailing edge of the output signal from the peak detector 15c represents the maximum value point a.

Figure 6:
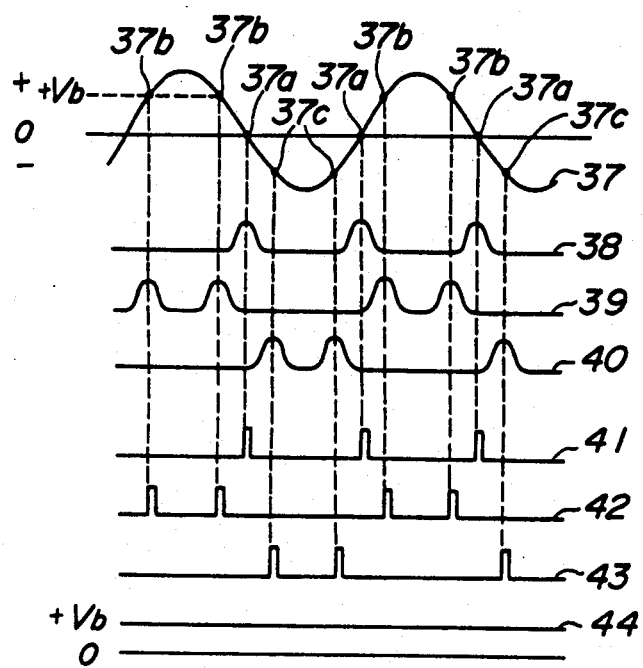
FIG. 6 shows waveforms of signals appearing at various points of the circuit shown in FIG. 2.

Now the operation of the automatic focussing system so far described will be explained in detail with reference to waveforms shown in FIG. 6. In FIG. 6, a waveform 37 represents the output signal from the position detecting coil 13' and a waveform 38 is the output signal from the differentiating circuit 15a in the focus detection circuit 15.

As explained above, the various parts are so adjusted that when the focussed image is formed on the pick-up plane 3, the image formed on the photo detector 5 becomes also in the best focussed condition when the auxiliary lens 4 is not modulated in position and is in the reference position. In such a condition, the output signal from the differentiating circuit 15a has its maximum value at zero cross points 37a of the output signal from the coil 13'. It should be noted that the auxiliary lens 4 should be vibrated at a frequency within a range in which a phase lag of the output signal from the coil 13' with respect to the vibration of the auxiliary lens 4 can be ignored. Now it is assumed that the focal point of the objective lens 1 is deviated from the pick-up plane 3 into a position 3' illustrated in FIG. 1. Then the focal point of the auxiliary lens 4 is also deviated from the photo detector 5 into a position 5' in FIG. 1. Then the output signal from the differentiating circuit 15a has a waveform 39 having a peak at points 37b. Contrary to this, when the focal point of the objective lens 1 is deviated into a position 3", the focal point of the auxiliary lens 4 is deviated into a position 5". Then the output signal from the differentiating circuit 15a is changed into a waveform 40 having peaks at points 37c. Waveforms 41, 42 and 43 are the sampling pulses from the focus detection circuit 15 corresponding to the waveforms 38, 39 and 40, respectively. For instance, when the output signal from the differentiating circuit 15a has the waveform 39 having the peaks at the points 37b, the sampling pulses 42 are derived from the focus detection circuit 15 and the output signal from the lens position detecting circuit 17 is sampled by the sampling pulses 42 and the sampled value is held. Therefore, the output signal from the sample and hold circuit 16 has a positive value Vb as shown by a waveform 44. In this manner, the maximum value point of the output signal from the differentiating circuit 15a is deviated with respect to the sinusoidal waveform 37 of the output signal from the coil 13' as shown by 37a, 37b and 37c in FIG. 6 in accordance with the deviation of the focal point of the objective lens 1 into the positions 3, 3' and 3" in FIG. 1.

The output signal from the coil 13' is amplified by the voltage amplifier 17a and is supplied through the direct current suppressing circuit 17b to the sample and hold circuit 16. The output from the peak detector 15c triggers the sampling pulse generator 15d to produce the sampling pulses 41, 42 or 43. As explained above due to the operation of the peak detector 15c, the sampling pulses are made coincident with the maximum value points of the output signal from the detector 15b. The sampling pulses are supplied to the sample and hold circuit 16 and the values of the output signal 37 from the lens position detecting circuit 17 at the positions 37a, 37b and 37c are sampled and held. The amplitude of the sampled values represents a magnitude of the focussing error and the polarity of the sampled values denotes a direction of the focussing error. When the best focussed image is formed on the pick-up plane 3, the maximum value point of the focus detection signal appears when the auxiliary lens 4 is in the reference position and thus, the output signal from the sample and hold circuit becomes zero volt. The output signal from the sample and hold circuit 16 is applied to a difference detection circuit 20 in which the signal is compared with a reference voltage produced by a potentiometer 23 to derive a difference voltage. The difference voltage thus detected is amplified by a voltage amplifier 21 and the amplified voltage signal is converted into a current signal and the converted current signal is amplified by a current amplifier 22. Then the amplified current signal is supplied to the driving motor 11 to move the objective lens 1 in the direction A. When the reference voltage formed by the potentiometer 23 is made equal to the output voltage from the sample and hold circuit 15 in the best focussed condition, i.e. zero volt, the system shown in FIG. 2 constitutes the negative feedback loop which can drive automatically the objective lens 1 into the focussing position.

As explained above, according to the present invention, the detection range can be adjusted at will by vibrating the auxiliary lens for detecting the focussing point and thus, the objective lens can be driven into the focussing position over a very wide range and further automatic focussing control can be effected very precisely.

What is claimed is:

1. A system for automatically driving an objective lens provided in a still camera, a television camera and the like into a desired focus position so as to form a focussed image of an object onto a predetermined focal plane comprising:

an auxiliary lens for receiving at least a part of a light flux transmitted through said objective lens and arranged movably along an optical axis;

a photo detector arranged to receive an image formed by said auxiliary lens to produce an electric signal;

means for vibrating repeatedly said auxiliary lens along the optical axis about a reference position which is conjugated with said predetermined focal plane;

means for detecting a position of said auxiliary lens to produce a lens position signal representing a deviation of the auxiliary lens with respect to the reference position;

means for receiving said electric signal from the photo detector to derive timings at which the best focussed condition is obtained during the vibration of the auxiliary lens to produce a sampling signal at said timings;

means for receiving said lens position signal and sampling signal to sample and hold the lens position signal by the sampling signal to produce a driving signal; and means for receiving the driving signal to move the objective lens into said desired focal position.

2. A system according to claim 1, wherein a half mirror is arranged between the objective lens and the predetermined focal plane in such a manner that a part of the light flux transmitted through the objective lens is reflected toward the auxiliary lens.

3. A system according to claim 1, wherein said auxiliary lens is held by a lens holder which is supported by a damper with respect to a fixed member so as to move the auxiliary lens along its optical axis.

4. A system according to claim 1, wherein said lens position detecting means comprises a coil wound around the auxiliary lens movably therewith and a magnet arranged around the coil to produce a constant magnetic field through which said coil moves.

5. A system according to claim 1, wherein said vibrating means comprises a moving coil wound around the auxiliary lens movably therewith and a magnet arranged around the moving coil to produce a constant magnetic field through said moving coil moves.

6. A system according to claim 1, wherein said auxiliary lens is vibrated at a frequency of about 100 Hz.

7. A system according to claim 1, wherein said photo detector comprises an array of photoelectric converting elements.

8. A system according to claim 1, wherein said timing signal generating means comprises a series circuit of a differentiating circuit, a detector, a peak detector and a sampling pulse generator.

9. A system according to claim 8, wherein said differentiating circuit has a frequency to gain characteristic of about 6 dB/Oct.

10. A system according to claim 8, wherein said peak detector comprises a sample and hold circuit to sample an output signal from the detector, a circuit for differentiating an output signal from the sample and hold circuit, positive and negative comparators for comparing an output signal from the differentiating circuit with threshold levels and a flip-flop being set and reset by output signals from the positive and negative comparators, respectively.

11. A system according to claim 10, wherein said sample and hold circuit is operated at a sampling frequency of about 1 to 5 MHz.

* * * * *